US007783065B2

(12) United States Patent
Navid

(10) Patent No.: US 7,783,065 B2
(45) Date of Patent: Aug. 24, 2010

(54) WIRELESS HEADPHONE KIT FOR MEDIA PLAYERS

(75) Inventor: Amir Navid, Sherman Oaks, CA (US)

(73) Assignee: NYKO Technologies, Inc., Los Angeles, CA (US)

( * ) Notice: Subject to any disclaimer, the term of this patent is extended or adjusted under 35 U.S.C. 154(b) by 1559 days.

(21) Appl. No.: 11/083,700

(22) Filed: Mar. 18, 2005

(65) Prior Publication Data

US 2006/0210092 A1 Sep. 21, 2006

(51) Int. Cl.
*H04R 5/02* (2006.01)
*H04R 1/10* (2006.01)
*H04R 25/00* (2006.01)
*G09F 27/00* (2006.01)
*H04B 7/00* (2006.01)
*H04M 1/00* (2006.01)
*H04H 20/71* (2008.01)
*H04H 40/00* (2008.01)

(52) U.S. Cl. ......................... 381/311; 381/74; 381/370; 381/124; 455/41.2; 455/556.1; 455/3.05; 455/3.06

(58) Field of Classification Search ................. 381/311, 381/74, 370, 77, 315; 455/575.2, 41.2, 556.1, 455/3.06, 3.05
See application file for complete search history.

(56) References Cited

U.S. PATENT DOCUMENTS

| | | | |
|---|---|---|---|
| 5,617,477 A | 4/1997 | Boyden | |
| 5,680,465 A | 10/1997 | Boyden | |
| 5,815,579 A | 9/1998 | Boyden | |
| 5,953,434 A | 9/1999 | Boyden | |
| 6,301,367 B1 | 10/2001 | Boyden et al. | |
| 6,424,820 B1 | 7/2002 | Burdick et al. | |
| 6,714,233 B2 | 3/2004 | Chihara et al. | |
| 6,728,585 B2 | 4/2004 | Neoh | |
| 2001/0003542 A1 | 6/2001 | Kita | |
| 2001/0004397 A1 | 6/2001 | Kita et al. | |
| 2002/0197064 A1 | 12/2002 | Bijsmans et al. | |
| 2003/0073460 A1 | 4/2003 | van Pelt et al. | |
| 2003/0118196 A1* | 6/2003 | Woolfork | 381/74 |
| 2004/0091124 A1 | 5/2004 | Chua et al. | |
| 2004/0116088 A1 | 6/2004 | Ellis et al. | |
| 2004/0161127 A1* | 8/2004 | Wagner | 381/315 |
| 2004/0171346 A1 | 9/2004 | Lin | |
| 2004/0185821 A1* | 9/2004 | Yuasa | 455/343.5 |
| 2008/0192950 A1* | 8/2008 | Slamka et al. | 381/77 |

* cited by examiner

*Primary Examiner*—Devona E Faulk
(74) *Attorney, Agent, or Firm*—Christie, Parker & Hale, LLP

(57) ABSTRACT

A wireless headphone kit for use with a media player. The wireless headphone kit includes a wireless headphone unit with an RF wireless receiver, a communication attachment unit that is adapted to physically attach to a media player device and communicates therewith, with the communication attachment unit having an RF wireless transponder that is adapted to communicate with the wireless headphone unit, and a wireless control device including a volume control, pause/play control, a forward control and a reverse control, which controls the communication attachment unit. The wireless headphone unit that is worn around a user's neck and includes earplugs with length adjustable wires.

6 Claims, 2 Drawing Sheets

WIRELESS HEADPHONE KIT FOR MEDIA PLAYERS

SUMMARY

The invention relates to wireless headphones and earphones, and more particularly to wireless headphone units for portable media players, with a portion worn around a user's neck, a separate control portion, and a communication attachment unit that fits on the portable media player.

BACKGROUND

The continued cost reduction in miniaturized electronics and memory storage has lead to the development of media players that store high volumes of media in small spaces. The use of small cassette tape players has largely been supplanted by CD players, and more recently, MP3 players.

An advantage of the MP3 players is that can store thousands of songs, photographs, books on tapes, and other digital files in a very small space, and provide a user with the ability to download songs one at a time or in groups from various music download services, and to literally carry around a whole music library and photo album in a user's pocket or backpack.

One popular brand of MP3 player is the ipod®, offered by Apple Computer, of Cupertino, Calif. The ipod® player is about the same size as a pack of standard playing cards. To listen to the device, headphones or earphone which are wired to a plug are plugged into a jack on the portable media player. Since some users prefer not to have any wires dangling from the media player to the headphones or earphones, various wireless headphones and earphones have been developed. These wireless headphones have a transmitter portion that connects to the media player, and transmits a signal via radio frequency (RF) to the headphones or earphones.

While wireless headphones and earphones may free the user from being tethered with wires to the media player, some of the prior wireless headphones and earphones can be relatively heavy and bulky and place excessive weight and stress on the user's head or ears. Moreover, these wireless headphones and earphones frequently do not give users the ability to control anything other than the volume to the headphones, and the volume control may not be conveniently accessible. Furthermore, operating the various functions of the portable media player without accessing a control panel and/or switches on the portable media player cannot be accomplished. Thus, while users may be freed from having their headphones tethered by wires to the portable media player, they still must directly access the portable media player's control panel and other switches to control the signal that goes to the headphones.

There accordingly remains a need for a wireless headphone kit for media players and a comfortable to wear wireless headphones unit, that permit a user to easily control the media player without directly accessing its control panel.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
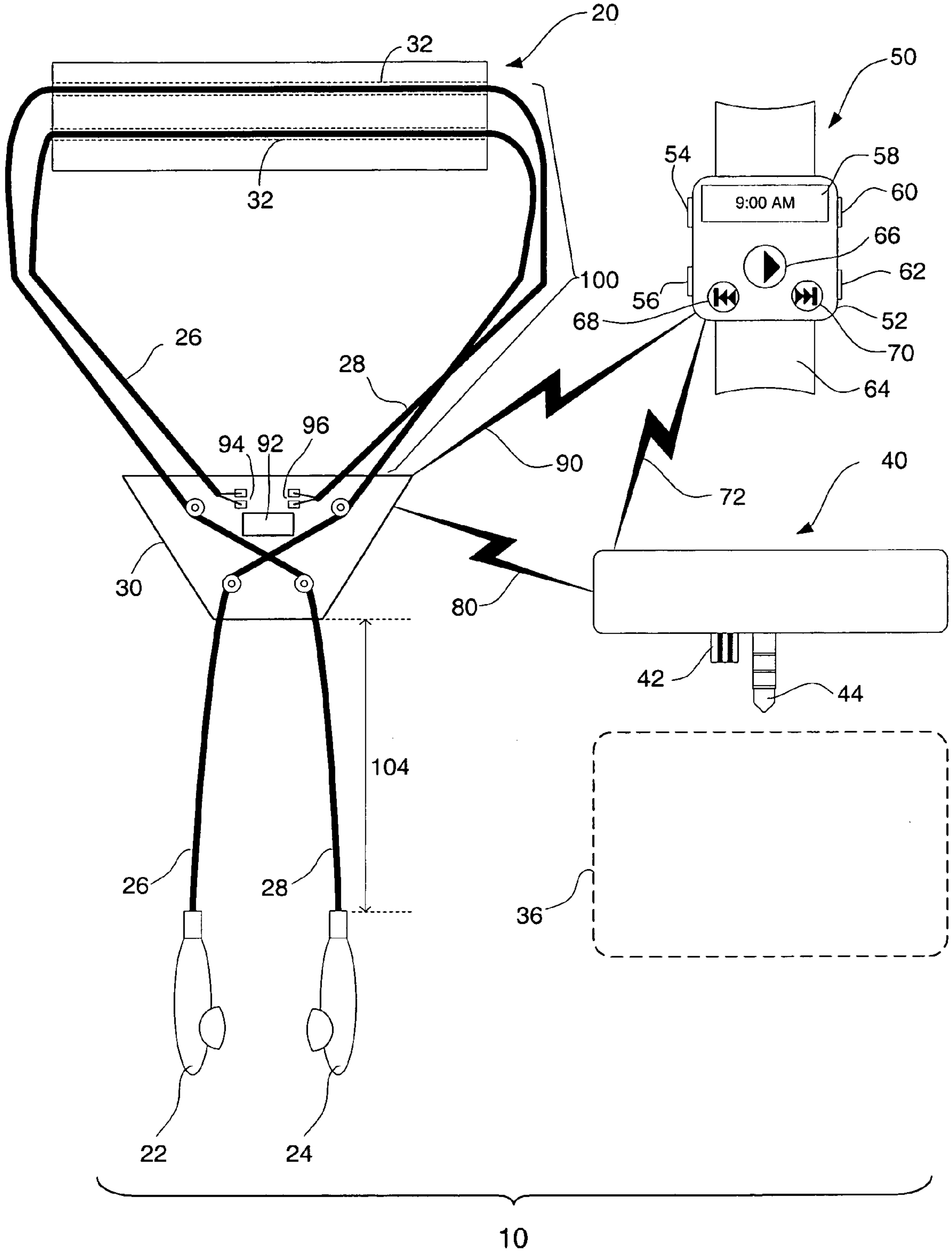
FIG. 1 is a front view of an exemplary embodiment of one form of the wireless headphone kit for media players of the invention with a wireless headphone unit with its earphone buds partially withdrawn, an communication attachment unit for a media player and a control device.

Turning first the FIG. 1, is a shown a front view of an exemplary embodiment of one form of the wireless headphone kit 10 for media players (in particular portable media players) of the invention which has a wireless headphone unit 20 with earphone buds 22 and 24 on wires 26 and 28 partially withdrawn from a length adjustment and communication case 30, with the wires 26 and 28 being slideably passable though passages 32 a neck sleeve 34. The neck sleeve 34 is preferably formed of a soft and absorbent material, and the passages are preferably formed such that the wires 26 and 28 can smoothly and freely slide therethrough. The wireless headphone kit 10 for portable media players also has a communication attachment unit 40 with connectors, e.g., via an accessory control plug 42 and a headphone plug 44 that permit it to be attached to a media player device 36, (shown in phantom.) The wireless headphone kit 10 is particularly well suited for use with portable media player devices. The communication attachment unit 40 comprises interface electronics that provides for electrical and logical communication between the communication attachment unit 40 through the accessory control plug so that the communication attachment unit 40 can control and communicate with the media player 36.

The communication attachment unit 40 shown is FIG. 1 is just an exemplary embodiment of one possible form of a communication attachment unit 40. The communication attachment unit 40 can take other forms as required to engage with media player devices. Lastly, the unit wireless headphone kit for portable media players 10 includes a control device 50 which is used to control and direct the communication attachment unit 40, and possibly also the headphone unit 20 directly. The control device 50 is shown in a form incorporated into a wrist watch, but the control device 50 can be part of another device or can be an independent device that is not part of another device. The control device 50 preferably has a case 52 with a volume control mechanism, for example, in the form of an increase volume button 54 and a decrease volume button 56. A time display 58 will appear on the control device if it is incorporated into a wrist watch and time setting and mode buttons 60 and 62 can also be provided to control the watch functions. The control device 50 can have a watch band 64 for carrying on a person's body, but can be carried in other known ways. In order to provide more full functionality, a play/pause button 66, a back button 68 and a fast forward button 70 can also be provided. The control device 50 include communication and control circuitry (not shown) that translations activation of the buttons to control signal(s), which control signal(s) are communicated via a wireless link 72 (e.g., RF) to the communication attachment unit 40 which attaches to the portable media player 36. The communication attachment unit 40 is adapted to communicate via a wireless link 80, e.g., RF, to the wireless headphone unit 20, in order to send an audio signal to the headphone unit 20 from the media player device through the communication attachment unit 40. As described so far, a user will engage the communication attachment unit 40 with the portable media player device 36. The control device 50 is used to control the portable media player 36 through the communication attachment unit 40 attached thereto, and can be used, for example, to control the volume, play, reverse, fast forward, etc. The audio signal is then sent via the communication link 80 to the headphone unit 20, for example to a RF receiver and communication circuitry 92 in the length adjustment and electronics case 30. An audio feed therefrom will be passed through pairs of contacts 94 and 96 to lead wires 26 and 28, respectively, to the earphones 22 and 24, respectively.

In another embodiment of the invention, the control device 50 can also have a direct communication link 90 with the communication circuitry 92 of the headphone unit 20, in which case the communication circuitry 92 can include a RF transmitter so that some or all of the control signals from the control device 50 will be sent from the control device 50 to the headphone unit 20 and bounced to the communication attachment unit 40, which will then send the appropriate signal back to the headphone unit 20.

Figure 2:
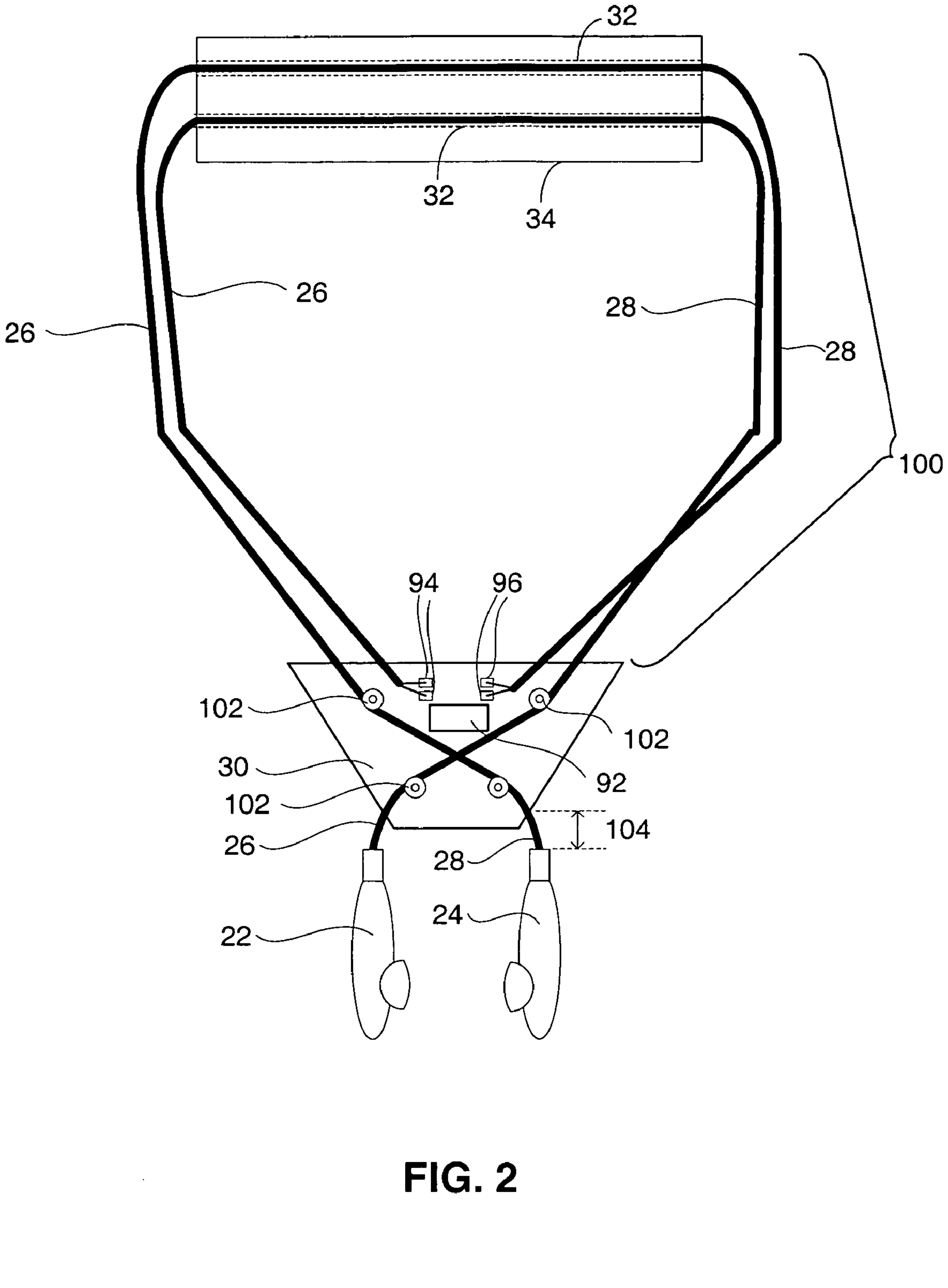
FIG. 2 is a front view of the exemplary embodiment of the wireless headphone unit of FIG. 1 with its earphone buds minimally withdrawn device.

FIG. 2 is a front view of the exemplary embodiment of the wireless headphone unit 20 of FIG. 1 with the earphone buds 22 and 24 minimally withdrawn from the communication case 30, which can comprise the state of the earphone buds 22 and 24 when not in use. The wireless headphone unit 10 of FIGS. 1 and 2 is well-suited to be worn around a user's neck, with the neck sleeve 34 being behind the nape of the user's neck, and with the length adjustment and communication case 30 being below a user's throat area or upper chest. Thus, the weight of the headphone unit 20 will be carried comfortably around a user's neck area. The wires 26 and 28 slideably pass through passageways 32 in the neck sleeve 34 and have free length portions 100 and enter the length adjustment and communication case 30, pass through guides 102 (e.g., pulleys), and exit the length adjustment and communication case 30 and connect to the ear buds 22 and 24 with working lengths 104 of the wires extending from the length adjustment and communication case 30. As shown in FIG. 2, the free lengths 102 of the wires 26 and 28 are relatively short, and in this position, the ear buds will lie on the user's chest below the throat area. By pulling down on the ear buds 22 and 24 while holding or pulling up on the length adjustment and communication case 30, the wires 26 and 28 will be pulled down through the length adjustment and communication case 30, which has the affect to lengthen the working lengths 102 and shorten the free lengths 102 of wires 26 and 28, as is shown in FIG. 1. Thus, the working lengths will be long enough to permit the ear buds 22 and 24 to be placed in a user's ears. When a user no longer wishes to uses the headphones, the user can simply pull downwardly on the length adjustment and communication case 30, with the neck sleeve 34 being retained (e.g., around a user's neck), which will cause the wires 26 and 28 to move back up through the length adjustment and communication case 30 to shorten the working lengths 104 and lengthen the free lengths 100 of wires 26 and 28, as shown in FIG. 2. The pulleys 102 are provided to ensure smooth and low force operation of the headphone unit 20. Other mechanisms can be used to control the working lengths 104 of the wires 26 and 28. While the wireless headphone unit 20 is shown as having the above described support features, if desired, the wireless headphone kit 10 of the invention can be used with a headphone unit that lacks a length adjustment mechanism.

Thus, by utilizing a separate the control device 50 to control the signal being transmitted to the headphone unit 20, the weigh of the headphone unit can be reduced, and greater control and functionality can be achieved without a user having to directly access the portable media player 36 each time a volume change or change to the tracks is desired.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive.

What is claimed is:

1. A wireless headphone kit for use with a media player, the wireless headphone kit comprising:

a wireless headphone unit with a wireless receiver, wherein the wireless headphone unit comprises a pair of wires with first and second ends, a pair of earphone buds, one each connected to the first end of two wires, a length adjustment and communication case with communication circuitry through which the two wires pass and a neck sleeve through which the two wires slideably pass and exit, with the second end of the wires being attached to the communication circuitry, wherein a working length of the pair of wires can be adjusted by pulling the wires through the length adjustment and communication case;

a communication attachment unit that attaches to a media player device and communicates therewith, the communication attachment unit having a wireless transponder that is adapted to communicate with the wireless headphone unit; and a wireless control device that controls the communication attachment unit.

2. A wireless headphone kit for use with a media player, the wireless headphone kit comprising:

a wireless headphone unit with a wireless receiver;

a communication attachment unit that attaches to a media player device and communicates therewith, the communication attachment unit having a wireless transponder that is adapted to communicate with the wireless headphone unit and wherein the communication attachment unit comprises a headphone plug and an accessory control plug; and a wireless control device that controls the communication attachment unit.

3. The wireless headphone kit of claim 2, wherein the communication attachment unit comprises interface electronics that provides for electrical and logical communication between the communication attachment unit and the accessory control plug.

4. A wireless headphone kit for use with a portable media player, the wireless headphone kit comprising:

a wireless headphone unit with an RF wireless receiver, wherein the wireless headphone unit comprises a pair of wires with first and second ends, a pair of earphone buds, one each connected to the first end of two wires, a length adjustment and communication case with communication circuitry through which the two wires pass and a neck sleeve through which the two wires slide ably pass and exit, with the second end of the wires being attached to the communication circuitry, wherein a working length of the pair of wires can be adjusted by pulling the wires through the length adjustment and communication case;

a communication attachment unit that is adapted to attach to a portable media player device and communicates therewith, the communication attachment unit having an RF wireless transponder that is adapted to communicate with the wireless headphone unit; and a wireless control device including a volume control, pause/play control, a forward control and a reverse control, that controls the communication attachment unit.

5. A wireless headphone kit for use with a portable media player, the wireless headphone kit comprising:

a wireless headphone unit with an RF wireless receiver;

a communication attachment unit that is adapted to attach to a portable media player device and communicates therewith, the communication attachment unit having an RF wireless transponder that is adapted to communicate with the wireless headphone unit and wherein the communication attachment unit comprises a headphone plug and an accessory control plug; and a wireless control device including a volume control, pause/play control, a forward control and a reverse control, that controls the communication attachment unit.

6. The wireless headphone kit of claim 5, wherein the communication attachment unit comprises interface electronics that provides for electrical and logical communication between the communication attachment unit and the accessory control plug.

* * * * *

UNITED STATES PATENT AND TRADEMARK OFFICE

CERTIFICATE OF CORRECTION

| | |
|---|---|
| PATENT NO. | : 7,783,065 B2 |
| APPLICATION NO. | : 11/083700 |
| DATED | : August 24, 2010 |
| INVENTOR(S) | : Amir Navid |

It is certified that error appears in the above-identified patent and that said Letters Patent is hereby corrected as shown below:

On the Title Page, Item

(57) Abstract, line 11 — Delete “that”

In the Claims

Column 4, Claim 4, line 61 — Delete “slide ably” Insert -- slideably --

Signed and Sealed this
Twenty-sixth Day of April, 2011

David J. Kappos

*Director of the United States Patent and Trademark Office*